(12) United States Patent
Huang et al.

(10) Patent No.: US 9,547,486 B2
(45) Date of Patent: Jan. 17, 2017

(54) CREATING A VIRTUAL RESOURCE PACKAGE

(71) Applicant: INTERNATIONAL BUSINESS MACHINES CORPORATION, Armonk, NY (US)

(72) Inventors: Yan Jun Huang, Beijing (CN); Wei Feng Tang, Beijing (CN); Xi Ning Wang, Beijing (CN); Bai Yue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 14/150,182

(22) Filed: Jan. 8, 2014

(65) Prior Publication Data

US 2014/0208320 A1 Jul. 24, 2014

(30) Foreign Application Priority Data

Jan. 24, 2013 (CN) .......................... 2013-10027488

(51) Int. Cl.
G06F 9/44 (2006.01)
G06F 9/445 (2006.01)
G06F 9/455 (2006.01)

(52) U.S. Cl.
CPC . *G06F 8/63* (2013.01); *G06F 8/20* (2013.01); *G06F 8/30* (2013.01); *G06F 8/71* (2013.01); *G06F 2009/45562* (2013.01)

(58) Field of Classification Search
CPC ................ G06F 8/20; G06F 8/30; G06F 8/36; G06F 8/71; G06F 9/44505; G06F 9/44521
See application file for complete search history.

(56) References Cited

U.S. PATENT DOCUMENTS

| 8,990,809 B1* | 3/2015 | Jacob | G06F 9/45533 718/1 |
| 9,317,311 B2* | 4/2016 | Anderson | G06F 9/45533 |
| 2006/0190985 A1* | 8/2006 | Vasishth | G06F 21/604 726/1 |

(Continued)

FOREIGN PATENT DOCUMENTS

CN 102082821 A 6/2011

OTHER PUBLICATIONS

Xu et al., "Research on an Approach of Cloud Workloads Deployment to Public Cloud Based on Open Source Standard", Mar. 2016, vol. 9, No. 3, International Journal of Grid and Distributed Computing, SERSC, pp. 209-220; <http://www.sersc.org/journals/IJGDC/vol9_no3/22.pdf>.*

(Continued)

*Primary Examiner* — Thuy Dao
*Assistant Examiner* — Ben C Wang
(74) *Attorney, Agent, or Firm* — Law Office of Jim Boice (57) ABSTRACT

A method, apparatus, and/or computer program product creates a virtual resource package. Metadata related to a machine is captured, where the machine is a physical machine and/or a virtual machine. A constraint definition describing a configuration constraint of the machine is generated based on the captured metadata. A disk image file of the at least one machine, the captured metadata and the generated constraint definition are packaged to generate the virtual resource package.

17 Claims, 6 Drawing Sheets

(56) References Cited

U.S. PATENT DOCUMENTS

| | | | | |
|---|---|---|---|---|
| 2008/0244595 | A1* | 10/2008 | Eilam | G06F 8/10 |
| | | | | 718/104 |
| 2011/0035747 | A1* | 2/2011 | Machida | G06F 8/63 |
| | | | | 718/100 |
| 2011/0107330 | A1 | 5/2011 | Freundlich et al. | |
| 2011/0265087 | A1* | 10/2011 | Chen et al. | 718/102 |
| 2011/0321033 | A1* | 12/2011 | Kelkar | G06F 9/44505 |
| | | | | 717/174 |
| 2012/0016970 | A1* | 1/2012 | Shah et al. | 709/220 |
| 2012/0246639 | A1* | 9/2012 | Kashyap | G06F 9/45558 |
| | | | | 718/1 |
| 2012/0260229 | A1* | 10/2012 | Peraza | G06F 9/45533 |
| | | | | 717/105 |
| 2012/0260249 | A1* | 10/2012 | Peraza | G06F 8/65 |
| | | | | 718/1 |
| 2012/0266170 | A1* | 10/2012 | Zimmerman et al. | 718/1 |
| 2013/0152080 | A1* | 6/2013 | Sachindran et al. | 718/1 |
| 2013/0174117 | A1* | 7/2013 | Watters | G06F 8/71 |
| | | | | 717/106 |
| 2013/0174122 | A1* | 7/2013 | Watters | G06F 8/36 |
| | | | | 717/121 |
| 2013/0174124 | A1* | 7/2013 | Watters | G06F 8/71 |
| | | | | 717/122 |
| 2013/0219388 | A1* | 8/2013 | Moeller | G06F 9/45558 |
| | | | | 718/1 |
| 2013/0263133 | A1* | 10/2013 | Prashanth | 718/1 |
| 2014/0068599 | A1* | 3/2014 | Kannan et al. | 718/1 |
| 2014/0143392 | A1* | 5/2014 | Ciano | H04L 41/0813 |
| | | | | 709/221 |
| 2014/0149695 | A1* | 5/2014 | Zaslavsky et al. | 711/162 |
| 2014/0208316 | A1* | 7/2014 | Ciano et al. | 718/1 |
| 2014/0373011 | A1* | 12/2014 | Anderson | G06F 9/45533 |
| | | | | 718/1 |
| 2015/0052525 | A1* | 2/2015 | Raghu | 718/1 |
| 2015/0074670 | A1* | 3/2015 | Gerganov | G06F 9/5027 |
| | | | | 718/103 |
| 2015/0074743 | A1* | 3/2015 | Ilieva et al. | 726/1 |

OTHER PUBLICATIONS

Schmidt et al., "VApp: A Standards-based Container for Cloud Providers", vol. 44 Issue 4, Dec. 2010, ACM, pp. 115-123; <http://dl.acm.org/citation.cfm?id=1899943&CFID=832850750&CFTOKEN=78484961>.*

Anastasi et al., "An OVF Toolkit Supporting Inter-Cloud Application Splitting", Dec. 2014, IEEE, pp. 96-101; <http://ieeexplore.ieee.org/stamp/stamp.jsp?tp=&arnumber=6968975>.*

J. Gee, "Understanding Project Kensho OVF Technology", citrix.com, Sep. 3, 2009, pp. 1-4.

VMWARE, Inc., "OVF Tool User Guide: VMWARE OVF Tool 1.0", VMWARE, Inc., 2009, pp. 1-28.

M. Jones, "Virtual Appliances and the Open Virtualization Format", IBM Corporation, Developerworks, Oct. 20, 2009, pp. 1-8.

* cited by examiner

CREATING A VIRTUAL RESOURCE PACKAGE

This application is based on and claims the benefit of priority from China (CN) Patent Application 201310027488.2, filed on Jan. 24, 2013, and herein incorporated by reference in its entirety.

BACKGROUND

The present invention relates to the field of virtualization, and more specifically, to a method and apparatus for creating a virtual resource package, for example, an Open Virtualization Format (OVF) package.

In the computer field, a virtualization technique has been widely used. With the virtualization technique, one or more virtual machines having complete computer system functions can be simulated on a physical machine. Each of the virtual machines may be based on a different virtualization platform, such as a virtualization platform from VMware®, a virtualization platform from Microsoft®, or the like. For convenience of development and deployment of the virtual machines, a virtual appliance is proposed. The virtual appliance is a pre-built software solution which includes one or more virtual machines packaged, maintained, updated and managed as one unit.

In order to standardize the virtual appliance, the Distributed Management Task Force (DMTF) has proposed an Open Virtualization Format (OVF) standard, which is used to package and distribute the virtual appliance (accordingly, software running on respective virtual machines in the virtual appliance) in an open, safe, portable, efficient and scalable format, and thereby simplify installation and deployment of the virtual appliance across multiple virtualization platforms. An OVF package created by packaging the virtual appliance typically includes: one OVF descriptor file (.ovf), i.e. "OVF envelope", which describes component parts of the virtual appliance, requirements of the respective component parts, etc.; zero or one OVF manifest file (.mf), which includes SHA-1 abstracts of respective files in the OVF package for ensuring integrity of the OVF package; zero or one OVF certificate file (.cert), which is used to sign the OVF package by signing the manifest file to ensure authenticity of the OVF package; and zero or more disk image files of the virtual machines.

Conventionally, the process of creating the OVF package is performed manually, which requires a user to execute an OVF creating tool deployed as an application on a general purpose computer. Such manual process requires specialized knowledge and is error-prone. Particularly, a system administrator having specialized knowledge of both the OVF and physical systems migrated to the virtual machines is often required to perform the creation of the OVF package. However, when creating the OVF package manually, even such experienced system administrator may enter an incorrect parameter accidentally so that the OVF package is flawed, resulting in that problems may occur in the virtual machines deployed finally.

In order to reduce manual operations, some methods for creating the OVF package have been proposed, which use OVF package creating tools to guide a user through the creation of the OVF package by, for example, graphical wizards. Although these methods provide a step toward automated creation of the OVF package, they still need many manual operations, and thus are still error-prone. In addition, when the OVF package is created, the existing methods cannot collect topology information for an existing runtime environment including physical machines and virtual machines, and it is also difficult to include contents describing configuration constraints for the respective virtual machines in the created OVF package.

SUMMARY

A method, apparatus, and/or computer program product creates a virtual resource package. Metadata related to a machine is captured, where the machine is a physical machine and/or a virtual machine. A constraint definition describing a configuration constraint of the machine is generated based on the captured metadata. A disk image file of the at least one machine, the captured metadata and the generated constraint definition are packaged to generate the virtual resource package.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, so that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, so that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process so that the instructions which execute on the computer or other programmable apparatus provide processes for implementing the functions/acts specified in the flowchart and/or block diagram block or blocks.

Figure 1:
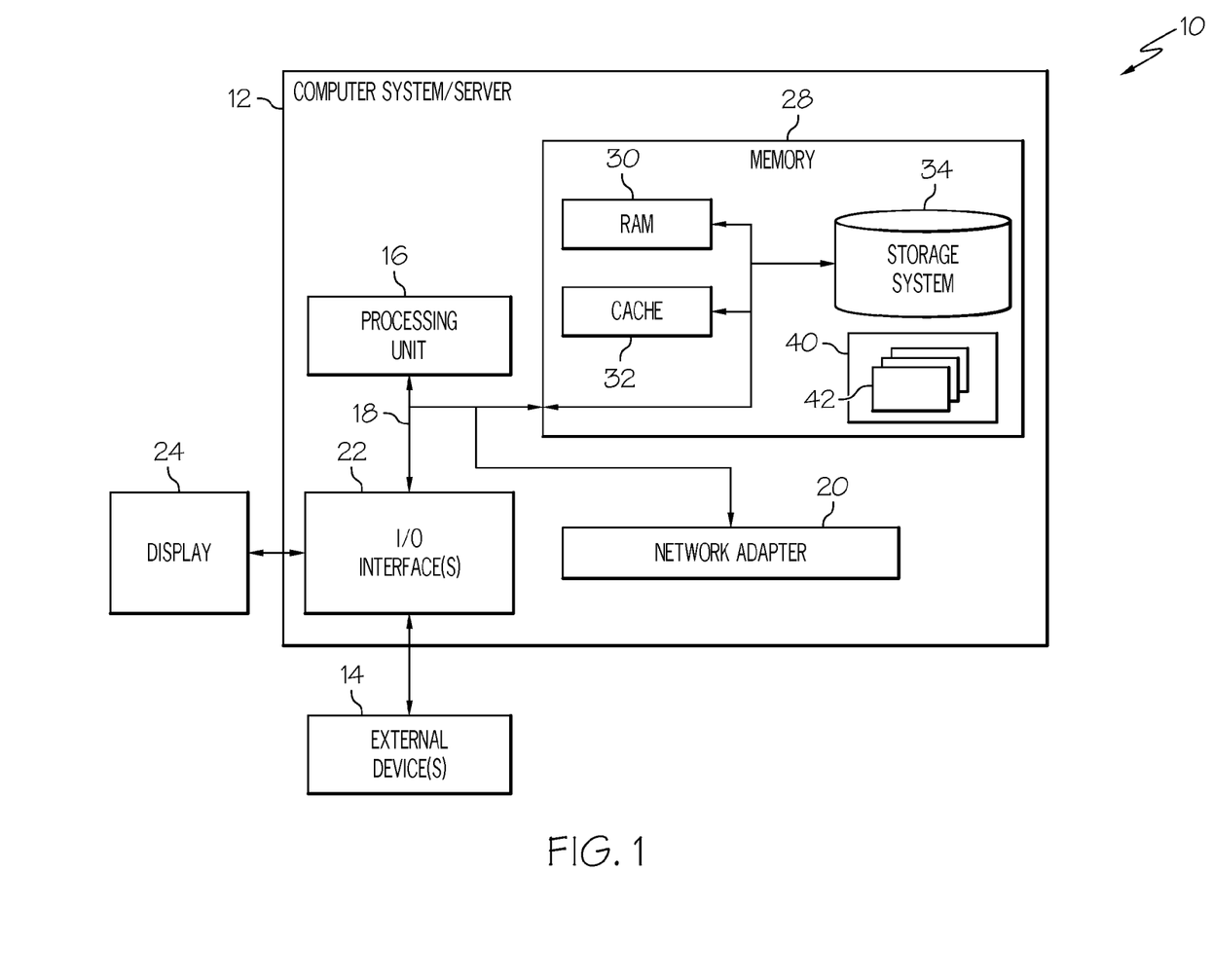
FIG. 1 shows a block diagram of an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
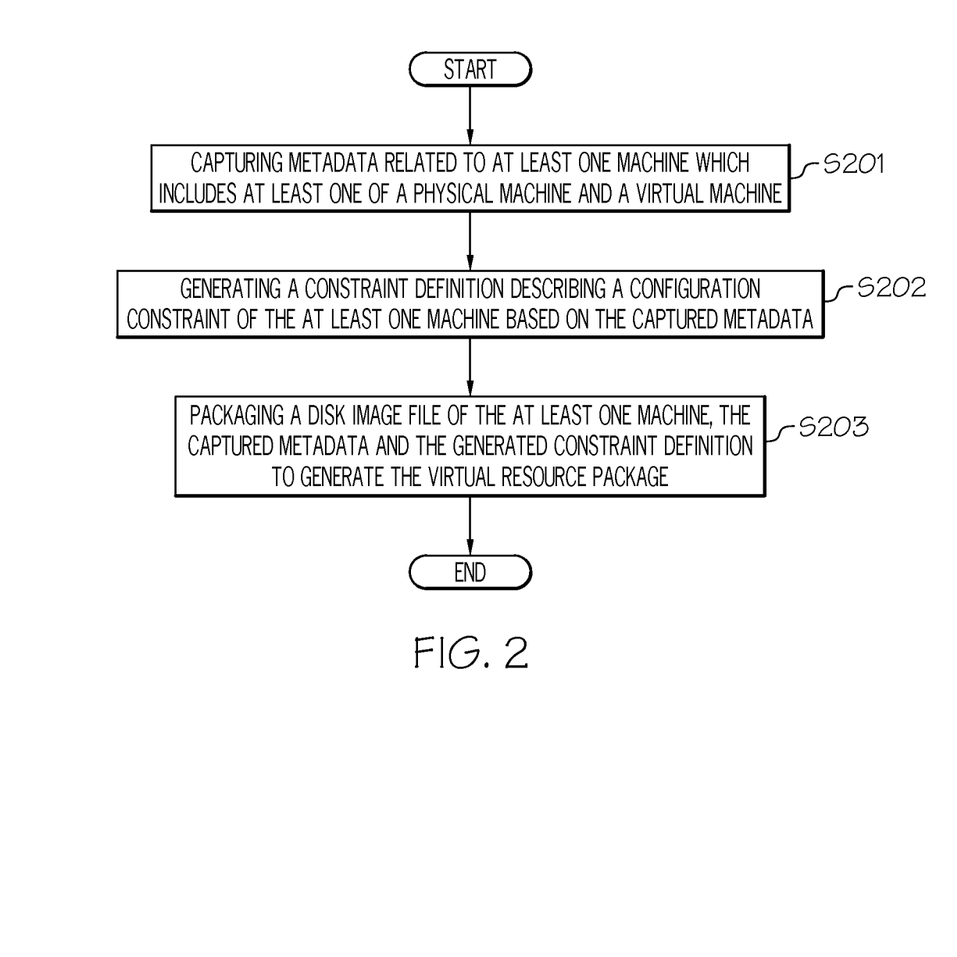
FIG. 2 is a flowchart showing a method for creating a virtual resource package according to an embodiment of the present invention.

Now reference is made to FIG. 2, which shows a flowchart of a method for creating a virtual resource package according to an embodiment of the present invention is shown. Here, an OVF package is taken as an example of the virtual resource package for convenient of description, however, the present invention is not limited thereto, but can also be applied to create other type of virtual resource package.

As shown in FIG. 2, in step S201, metadata related to at least one machine are captured. The machine may be at least one of a physical machine and a virtual machine. That is, the at least one machine may be a virtual machine, a physical machine, or a combination of a virtual machine and a physical machine. The captured metadata related to each machine can be converted into a data file so as to store these metadata. For example, the captured metadata related to the respective machines can be converted into data files in an eXtensible Markup Language (XML) format respectively, and these data files are stored. The format of the data files is not limited to the XML format, and the captured metadata may also be converted into data files in any other appropriate formats.

When the machine is a virtual machine, one or more of resource information, operation system information and software information of the virtual machine may be captured as the metadata related to the machine. When the machine is a physical machine, one or more of operation system information and software information of the machine may be captured as the metadata related to the machine. Other information of the machine may be captured as the metadata related to the machine according to actual needs.

The resource information of the virtual machine refers to information related to resources possessed by the virtual machine. For example, the resource information may include at least one of information related to a CPU of the virtual machine (e.g., an operating frequency of the CPU and the like), information related to a memory of the virtual machine (e.g., a size of the memory and the like), information related to a disk space of the virtual machine (e.g., a size of the disk space and the like), information related to a network of the virtual machine (e.g., an IP address, a network port, and the like used by the virtual machine), and information related to other resources of the virtual machine. The resource information can be captured by reading a related configuration file of the virtual machine or in other manners commonly known in the art.

Figure 3:
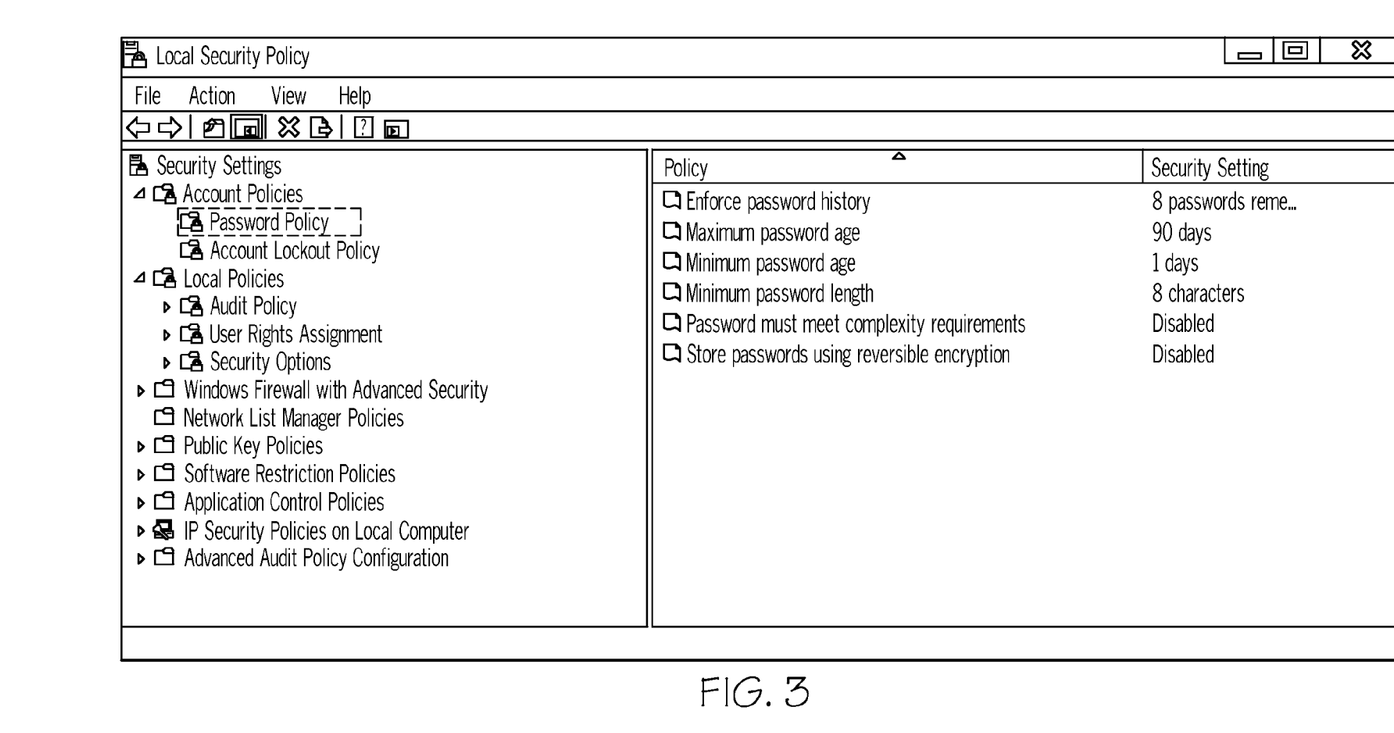
FIG. 3 shows an example of reading security configuration information of a Windows operation system installed on a virtual machine through an API.

The operation system information of the virtual machine refers to information related to an operation system of the virtual machine. For example, the operation system information may include at least one of version information of the operation system, security configuration information (e.g., a length of a password, a lifespan of the password, etc.), user account information, and other information related to the operation system. Since various information of the operation system is saved in one or more configuration files, the operation system information may be captured by reading the configuration files of the operation system. For example, the operation system information may be captured by reading the configuration files though an Application Programming Interface (API) provided by the operation system. FIG. 3 shows an example of reading security configuration information of a Windows operation system installed on a virtual machine through an API. As shown in FIG. 3, the security configuration information of the Windows operation system may be captured by reading a "Local Security Policy" configuration file of the operation system by using an API provided by the operation system. In the configuration file, account policies including a password policy and an account lockout policy, local policies, firewall settings, and the like of the operation system are defined. In this example, by reading the configuration information in the configuration file, the following security configuration information may be captured: a Maximum Password Age (maxPasswordAge) of 90 days, a Minimum Password Age (minPasswordAge) of 1 day, a Minimum Password Length (minPasswordLength) of 8 characters, an Account Lockout Threshold (LockPolicy threshold) of 0, etc. As described above, the captured metadata can be converted into a data file. A code segment 1 below shows a part of the data file, which records the security configuration information of the operation system captured in the example of FIG. 3.

[Code Segment 1]

```
<Metadata>
    <OSConstraints>
        <AccountPolicies>
            <PasswordPolicy maxPasswordAge="90"
            minPasswordAge="1"
                minPasswordLength="8" />
            <LockPolicy threshold="0" />
        </AccountPolicies>
    </OSConstraints>
</Metadata>
```

It is to be noted that the operation system may be a predefined operation system, for example a Windows operation system from Microsoft Corporation, or may be a user-customized operation system, for example, a certain Linux operation system customized by a user. For the predefined operation system, since a configuration manner of the operation system has already been known, the configuration file of the operation system can be found and read based on the existing knowledge of the operation system, so as to capture the operation system information. For the user-customized operation system, the configuration file of the operation system can be found and read according to rules set by the user, so as to capture the operation system information. Alternatively, the operation system information can be captured by using other measures commonly known in the art.

The software information of the virtual machine refers to information related to software installed on the virtual machine. The software may be stand-alone software, or may be distributed software which is distributed on multiple machines which are co-located or far from each other. For example, the software information includes at least one of version information of the software, information related to a virtualization platform on which the software is installed, ware, information related to a node "Custom Node" to be invoked by the software, information related to a component "Lombardi" of the software, information related to a database "DB" to be invoked by the software, and the like may be acquired by reading and analyzing the configuration file of the software.

[Code Segment 2]

```
<Metadata>
    <SoftwareConstraints>
        <TemplateParts >
            <Part partType =" DMGR" partTypeVersion ="1.0.0" >
                <keyAttribute name="Hypervisor" value="VMware-ESXi"/>
                    <keyAttribute name="OS" value="SUSE 10 Slim"/>
                    <keyAttribute name="WebSphere Edition" value="ND"/>
                    <keyAttribute name="WebSphere Version" value="cf190840.40"/>
                    <keyAttribute name="Build" value="cf190840.40"/>
                    <virtualSystem id="ND /Virtual_WebSphere_System"/>
            </ Part >
            <Part partType =" Custom Node" partTypeVersion ="1.0.0"   Number ="2">
                <keyAttribute name="Hypervisor" value="VMware-ESXi"/>
                    <keyAttribute name="OS" value="SUSE 10 Slim"/>
                    <keyAttribute name="WebSphere Edition" value="ND"/>
                    <keyAttribute name="WebSphere Version" value="cf190840.40"/>
                    <keyAttribute name="Build" value="cf190840.40"/>
                    <virtualSystem id="ND /Virtual_WebSphere_System"/>
            </ Part >
            <Part partType =" Lombardi" partTypeVersion ="1.0.0" >
                <keyAttribute name="Hypervisor" value="VMware-ESXi"/>
                    <keyAttribute name="OS" value="SUSE 10 Slim"/>
                    <keyAttribute name="Lombardi Edition" value="typical"/>
                    <keyAttribute name="Lombardi Version" value="7.5"/>
                    <virtualSystem id="ND /Virtual_WebSphere_System"/>
            </ Part >
            <Part partType =" DB" partTypeVersion ="1.0.0" >
                <keyAttribute name="Hypervisor" value="VMware-ESXi"/>
                    <keyAttribute name="OS" value="SUSE 10 Slim"/>
                    <keyAttribute name="DB Edition" value="Enterprise"/>
                    <keyAttribute name="DB Version" value="9.7"/>
                   <keyAttribute name="port" value="range[2000,5000]"/>
                    <virtualSystem id="ND /Virtual_WebSphere_System"/>
            </ Part >
        </TemplateParts >
    </ SoftwareConstraints >
</Metadata>
``` topology information representing a topology structure of the software, information related to objects/resources (for example, port or data resources) invoked by the software, or may be other types of software information.

The software information can be acquired according to a configuration file of the software. For example, the version information of the software, the information related to the virtualization platform on which the software is installed, and so on can be acquired directly by reading the configuration file. In addition, a topology structure of the software may be determined by analyzing the configuration file of the software, so as to acquire the topology information of the software. Then, the information related to the objects/resources invoked by the software and the like can be acquired by analyzing the topology structure of the software. For example, for server software "WebSphere Application Server" from the International Business Machine Company installed on the virtual machine, the topology structure of the software may be determined by analyzing the configuration file of the software, then the information related to the objects (nodes) and/or resources to be invoked by the software when it is executed and the like may be acquired. A code segment 2 below shows a part of the data file which records the captured software information in the example of the server software "WebSphere Application Server". As shown in the code segment 2, information related to a component "Deployment Manager (DMGR)" of the soft- As known in the art, various types of software, including general software and user-customized software, may be installed on the virtual machine. For the general software, a general software information capturing tool may be designed in advance according to existing knowledge of the software, so that the tool is used if necessary to capture the software information. For the customized software, a corresponding software information capturing tool may be designed according to rules of the software, so that the tool is used if necessary to capture the software information. A corresponding software information capturing tool may be designed for each type of software, so that the software information of various software can be captured.

For the physical machine, the operation system information and the software information to be captured are the same as those of the virtual machine described above, respectively, and a detailed description thereof is omitted herein.

As described above, the acquired metadata related to the at least one machine can be converted into a corresponding data file. An example of the data file obtained by converting all the metadata related to one machine is shown in a code segment 3 below, and the metadata includes the security configuration information shown in the code segment 1 and the software information shown in the code segment 2.

[Code Segment 3]

```xml
<Metadata>
    <OSConstraints>
        <AccountPolicies>
            <PasswordPolicy maxPasswordAge="90" minPasswordAge="1"
                minPasswordLength="8" />
            <LockPolicy threshold="0" />
        </AccountPolicies>
    </OSConstraints>
    <SoftwareConstraints>
        <TemplateParts >
            <Part partType =" DMGR" partTypeVersion ="1.0.0" >
                <keyAttribute name="Hypervisor" value="VMware-ESXi"/>
                <keyAttribute name="OS" value="SUSE 10 Slim"/>
                <keyAttribute name="WebSphere Edition" value="ND"/>
                <keyAttribute name="WebSphere Version" value="cf190840.40"/>
                <keyAttribute name="Build" value="cf190840.40"/>
                <virtualSystem id="ND /Virtual_WebSphere_System"/>
            </ Part >
            <Part partType =" Custom Node" partTypeVersion ="1.0.0"   Number ="2">
                <keyAttribute name="Hypervisor" value="VMware-ESXi"/>
                <keyAttribute name="OS" value="SUSE 10 Slim"/>
                <keyAttribute name="WebSphere Edition" value="ND"/>
                <keyAttribute name="WebSphere Version" value="cf190840.40"/>
                <keyAttribute name="Build" value="cf190840.40"/>
                <virtualSystem id="ND /Virtual_WebSphere_System"/>
            </ Part >
            <Part partType =" Lombardi" partTypeVersion ="1.0.0" >
                <keyAttribute name="Hypervisor" value="VMware-ESXi"/>
                <keyAttribute name="OS" value="SUSE 10 Slim"/>
                <keyAttribute name="Lombardi Edition" value="typical"/>
                <keyAttribute name="Lombardi Version" value="7.5"/>
                <virtualSystem id="ND /Virtual_WebSphere_System"/>
            </ Part >
            <Part partType =" DB" partTypeVersion ="1.0.0" >
                <keyAttribute name="Hypervisor" value="VMware-ESXi"/>
                <keyAttribute name="OS" value="SUSE 10 Slim"/>
                <keyAttribute name="DB Edition" value="Enterprise"/>
                <keyAttribute name="DB Version" value="9.7"/>
                <keyAttribute name="port" value="range[2000,5000]"/>
                <virtualSystem id="ND /Virtual_WebSphere_System"/>
            </ Part >
        </TemplateParts >
    </ SoftwareConstraints >
</Metadata>
```

It is to be noted that, although the data file shown in the code segment 3 is written in the XML format, the data file is not limited to the XML format, and may be in any other appropriate format.

Referring back to FIG. 2, next, in step S202, a constraint definition describing a configuration constraint of the at least one machine is generated based on the captured metadata related to the at least one machine. The configuration constraint may include at least one of a configuration constraint of the operation system, a configuration constraint of the software, and a triggered action constraint, and may further include other configuration constraints when necessary. The user can select one or more of these configuration constraints according to actual needs. The constraint definition may be construed as rules that should be followed when a machine is deployed according to the generated OVF package.

Briefly, the metadata related to the at least one machine which are captured in step S201 include the operation system information, the software information and the like of the machine. The information may contain information showing the configuration constraint of the machine, such as the security configuration information described above, and the constraint definition describing the configuration constraint of the machine can be generated based on the information. In addition, the user may set manually a constraint that he/she wants to impose on the configuration of the machine if necessary, and a corresponding constraint definition may be generated.

Figure 4:
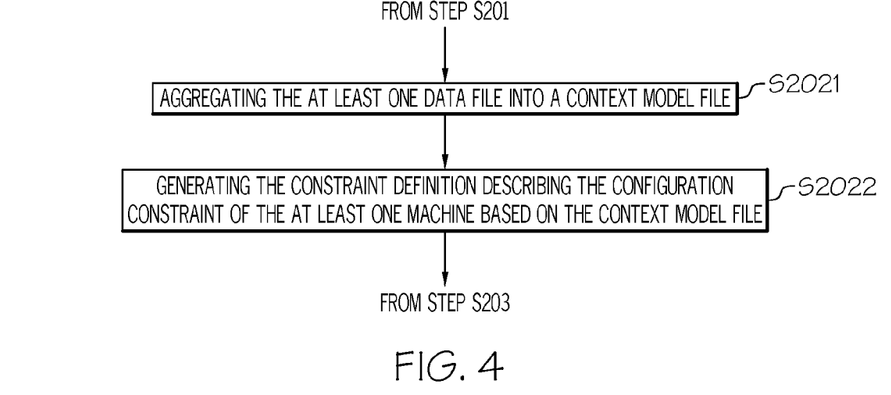
FIG. 4 shows a detailed flowchart for an operation of generating a constraint definition describing a configuration constraint of at least one machine.

Step S202 will be described in more detail below with reference to FIG. 4. FIG. 4 shows a detailed flowchart for the operation of generating the constraint definition describing the configuration constraint of the at least one machine, which is performed in step S202.

As shown in FIG. 4, firstly, in step S2021, at least one data file obtained by converting the metadata related to the at least one machine which is captured in step S201 is aggregated into a single file. The single file describes a context required for configuring the at least one machine, and thus can be referred to as a context model file. The respective data file(s) can be aggregated into the context model file in any appropriate manner. For example, contents of the respective data file(s) may be copied into the single file, and organized according to predetermined rules, so as to form the context model file. For example, the contents of the respective data file(s) may be organized according to categories of the contents (for example, contents related to the software, contents related to the operation system, etc.), so that contents in a same category from the respective data file(s) are placed together in the context model file. It is to be noted that, when there is only one machine, the aggregating operation may be omitted, and the data file generated for the machine can be directly used as the context model file. Hereinafter, the data file shown in the code segment 3 is taken as an example of the context model file for simplicity, although the data file only includes the metadata from one machine.

Next, in step S2022, the constraint definition describing the configuration constraint of the at least one machine is generated based on the context model file. As described above, the configuration constraint may include at least one of the configuration constraint of the operation system, the configuration constraint of the software, and the triggered action constraint. In the present embodiment, the constraint definition is generated in the Service Modeling Language (SML), but the present invention is not limited thereto, and the constraint definition can be generated in any other appropriate language and/or format.

Particularly, the configuration constraint of the operation system may include a security constraint and the like, for example. The security constraint may include account policies such as a password policy and an account lockout policy of the operation system and the like, in which the password policy may include a length and a password used in the operation system, a lifespan of the password, etc. The type of the configuration constraint of the operation system may be selected by the user as required, and a corresponding constraint definition may be generated. The constraint definition describing the configuration constraint of the operation system may be generated automatically based on the metadata (for example, the metadata of the operation system) related to the at least one machine which are recorded in the context model file. In the example described above, the captured metadata include the security configuration information of the operation system of the at least one machine, thus the security constraint of the operation system may be obtained by extracting the security configuration information from the context model file including the metadata, and then the security constraint definition may be generated in the SML format. For example, in the example of the context model file shown in the code segment 3, the security configuration information related to the password policy of the operation system is recorded, i.e. maxPasswordAge="90", minPasswordAge="1", and minPasswordLength="8"; when the user decides to impose a security constraint on the password policy (for example, the lifespan of the password), the security configuration information, maxPasswordAge="90", may be extracted from the context model file, and based on the information, a constraint definition in the SML format, i.e. assert id="AccountPolicy" test="AccountPolicies/PasswordPolicy/@maxPassword Age='90'", may be generated automatically, which defines maximum lifespan of the password to 90 days. Similarly, by extracting the security configuration information "LockPolicy threshold='0'" from the context model file shown in the code segment 3, a constraint definition in the SML format, i.e. assert id="LockPolicy" test="AccountPolicies/LockPolicy/@threshold='0'", may be generated automatically, so that the configuration constraint on the account lockout is applied, and this constraint definition shows that the corresponding account will never be locked. The user may modify the constraint definition generated in the above manner. For example, the user may modify the lifespan of the password from 90 days to 60 days. Or, the user may define an additional configuration constraint of the operation system by himself/herself, and a corresponding constraint definition may be generated in a predetermined format.

The configuration constraint of the software may include a topology configuration constraint related to a topology structure of the software, a security configuration constraint of the software, etc. The type of the configuration constraint of the software may be selected by the user as required, and a corresponding constraint definition may be generated. The constraint definition describing the configuration constraint of the software may be generated automatically based on the metadata (for example, the metadata of the software) related to the at least one machine which are recorded in the context model file. In the example of the context model file shown in the code segment 3, metadata related to custom nodes ("Custom Node") connected to the server software "WebSphere Application Server" are included, and according to the metadata, a constraint definition which imposes a constraint on a number of the custom nodes, i.e. assert id="Custom Node" test="TemplateParts/Part[@partType='Custom Node']/@number='2'", may be generated automatically, and this constraint definition limits the number of the custom nodes connected to the server software to 2. Likewise, when the user decides to impose a configuration constraint related to ports on a database connected to the server software, a constraint definition, i.e. assert id="DB" test="TemplateParts/Part[@partType='DB']/keyAttribute/@port='range[2000,5000]'", may be generated automatically based on the metadata related to the database "DB" in the context model file shown in the above code segment 3, so that a range of the ports is limited between 2000 and 5000. Likewise, the user may modify the constraint definition generated in the above manner. For example, the user may modify the constraint on the number of the custom nodes from 2 to 3. Or, the user may define an additional configuration constraint of the operation system by himself/herself, and a corresponding constraint definition may be generated in a predetermined format.

In addition, the user may set, for various defined configuration constraints, an action to be triggered by the constraints, i.e. a triggered action constraint, and a corresponding constraint definition may be generated. The action may relate to only one machine (physical machine or virtual machine). For example, for the above configuration constraint "assert id="DB" test="TemplateParts/Part[@partType='DB']/keyAttribute/@port='range[2000,5000]'"", it is possible to set an action to be triggered "action method="setPort(3000)"", that is, set an action of setting the port to 3000. The action set by the user may span two or more machines, so that software correlation spanning the multiple machines may be reflected in the constraint definition. For example, a constraint definition describing a triggered action constraint shown in the following code segment 4 may be set, and shows that when Lombardi Topology of a host at 192.168.1.100 is Golden Topology, actions "showInfo (showing information)" and "configCustomNodeNumber" (configuring the number of the custom nodes) are performed, where the action "configCustomNodeNumber" is performed by a deployment manager of another host at 192.168.1.101 so that the number of the custom nodes is set to 5.

[Code Segment 4]

```
<rule context="/SoftwareConstraints">
    <assert id="LombardiTopology" test="TemplateParts/Part[@partType ='Lombardi']/
        keyAttribute[@name='type' and host='192.168.1.100']/@value = ' Golden Topology'">
        <action method="showInfo" > This topology determines that there are five custom nodes. </action>
        <action method="configCustomNodeNumber" >
            <executePath> TemplateParts/Part[@partType ='Deployment Manager' and
```

-continued

```
    keyAttribute/[@name='host' and value='192.168.1.101']]/ keyAttribute
    [@name='customNodeNumber']/@value = '5'</executePath>
        </action>
    </assert>
</rule>
```

In addition, when the context model file includes contents representing some type of condition, a corresponding triggered action may be set, as a triggered action constraint, for the condition, so that the action is triggered when the condition is satisfied. For example, when the context model file includes the conditional statement "If (VM1.Softwares.Lombardi.DBUsageType=="Typical" && VM1.OS.port within range [2000, 5000])", a certain triggered action "action1" may be set for the condition, so that the action "action1" is performed when the above condition is satisfied. The following code segment 5 shows an example of a constraint definition of the triggered action constraint thus generated.

[Code Segment 5]

If (VM1.Softwares.Lornbardi.DBUsageType=="Typical" && VM1.OS.port within range [2000, 5000]) then action 1.

The following code segment 6 shows an example of a constraint definition generated based on the context model file shown in the code segment 3.

[Code Segment 6]

be generated by using any method commonly known in the art, and a detailed description thereof is omitted herein for simplicity.

Therefore, the OVF package may be generated for the at least one machine (physical machine and/or virtual machine).

Hereinafter, a description will be given to a block diagram of a structure of an apparatus for creating a virtual resource package according to an embodiment of the present invention with reference to FIG. 5. The apparatus may execute the above described method.

Figure 5:
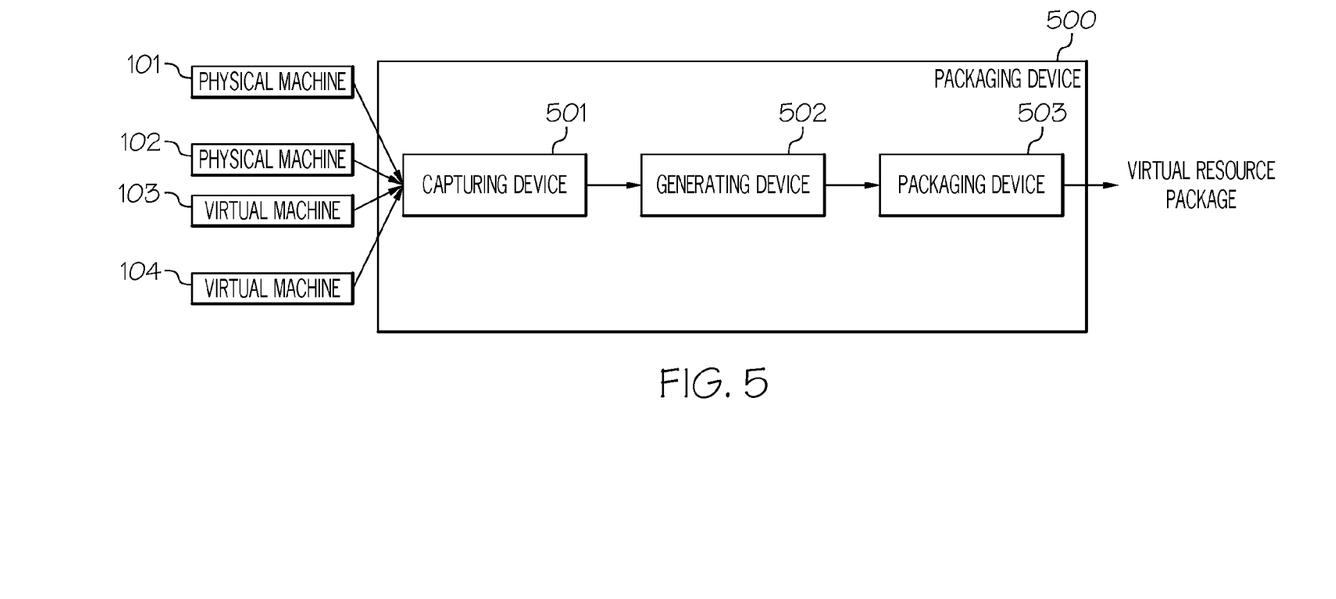
FIG. 5 is a block diagram showing a structure of an apparatus for creating a virtual resource package according to an embodiment of the present invention.

As shown in FIG. 5, the creating apparatus 500 according to the embodiment of the present invention includes a capturing device 501, a generating device 502 and a packaging device 503. The creating apparatus 500 may be used to create the virtual resource package of at least one machine which may be a physical machine, a virtual machine, or a combination of a physical machine and a virtual machine. In FIG. 5, four machines, i.e. physical machines 101 and 102 and virtual machines 103 and 104, are shown as an example.

```
<schema>
    <pattern>
        <rule context="/OSConstraints">
            <assert id="AccountPolicy" test="AccountPolicies/PasswordPolicy/@maxPasswordAge='90'">
                    this security setting determines a period of time (in days) for which the password can be
                    used before the user is required by the system to change it. </assert>
            <assert id="LockPolicy" test="AccountPolicies/LockPolicy/@threshold = '0'">this account will
                    never be locked.</assert>
        </rule>
        <rule context="/SoftwareConstraints">
            <assert id="Custom Node" test="TemplateParts/Part[@partType='Custom Node']/@number =
                    '2'">this topology determines that there are two custom nodes. </assert>
            <assert id="DB" test="TemplateParts/Part[@partType ='DB']/keyAttribute/@port =
                    'range[2000,5000]'">
                <action method="setPort(3000)" />
            </assert>
        </rule>
        <rule context="/SoftwareConstraints">
            <assert id="LombardiTopology" test="TemplateParts/Part[@partType ='Lombardi']/
                    keyAttribute[@name='type' and host='192.168.1.100']/@value = ' Golden Topology'">
                <action method="showInfo" > this topology determines that there are two custom nodes.</action>
                <action method="configCustomNodeNumber" >
                    <executePath> TemplateParts/Part[@partType =' Deployment Manager ' and
                    keyAttribute/[@name='host' and value='192.168.1.101']]/ keyAttribute
                    [@name='customNodeNumber']/@value = '5'</executePath>
                </action>
            </assert>
        </rule>
    </pattern>
</schema>
```

Returning to FIG. 2, in step S203, a disk image file of the at least one machine, the metadata related to the at least one machine which are captured in step S201, and the constraint definition generated in step S202 are packaged, so as to generate an OVF package. Particularly, the disk image file, the respective data file(s) including the metadata, and a constraint definition file including the generated constraint definition are packaged together in the OVF format, thereby forming the OVF package. The disk image file of the at least one machine (physical machine and/or virtual machine) may Hereinafter, for convenience of description, the OVF package is used as an example of the virtual resource package. However, the present invention is not limited thereto, and may be applied to create other type of virtual resource package.

The capturing device 501 captures metadata related to the respective machines 101-104. The capturing device 501 may convert the captured metadata related to the respective machines into data files in an XML format, respectively. It is to be recognized that the capturing device 501 may also convert the captured metadata into data files in any other appropriate formats.

Figure 6:
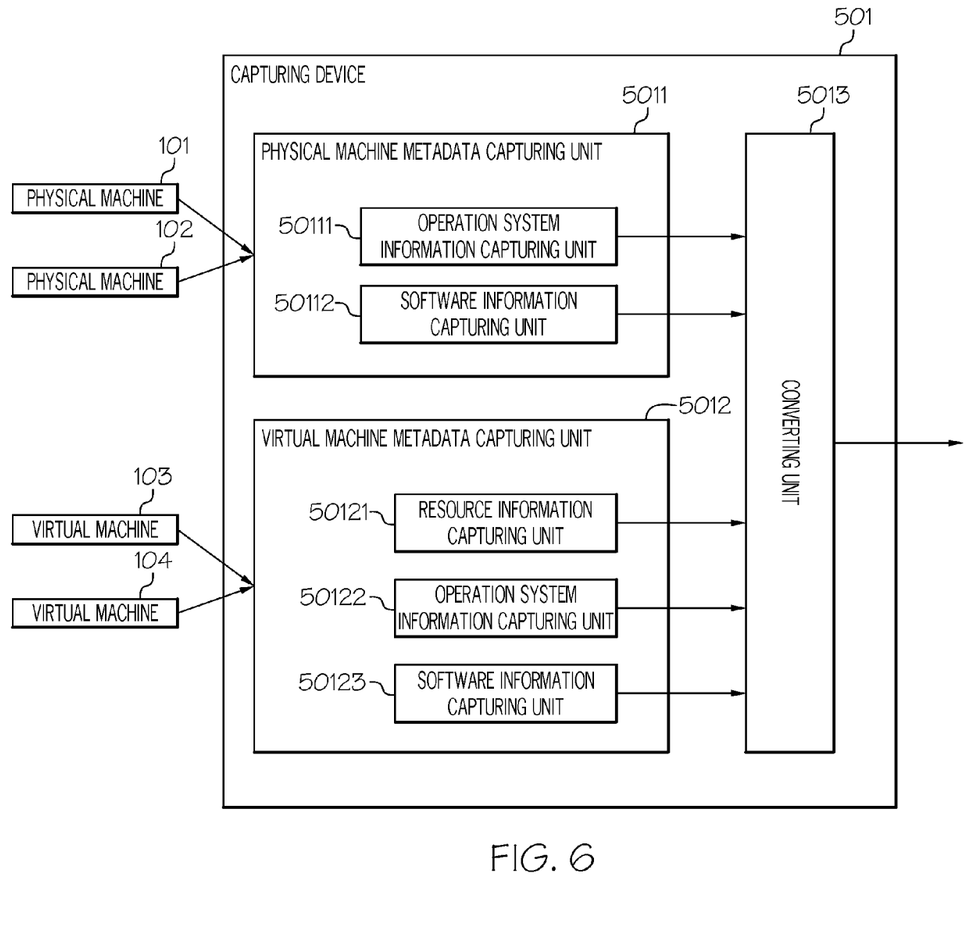
FIG. 6 is a block diagram showing a structure of a capturing device shown in FIG. 5.

Hereinafter, the capturing device 501 will be described with reference FIG. 6. FIG. 6 shows a structural block diagram of the capturing device 501. As shown in FIG. 6, the capturing device 501 may include a physical machine metadata capturing unit 5011 for capturing metadata related to a physical machine, a virtual machine metadata capturing unit 5012 for capturing metadata related to a virtual machine, and a converting unit 5013 for converting the captured metadata related to the respective machine(s) into a data file(s) respectively. It is to be recognized that when the at least one machine is the physical machine or the virtual machine, the virtual machine metadata capturing unit 5012 or the physical machine metadata capturing unit 5011 may be accordingly removed.

The physical machine metadata capturing unit 5011 may include an operation system information capturing unit 50111 and a software information capturing unit 50112. The virtual machine metadata capturing unit 5012 may include a resource information capturing unit 50121, an operation system information capturing unit 50122 and a software information capturing unit 50123. All of the capturing units in the physical machine metadata capturing unit 5011 and the virtual machine metadata capturing unit 5012 are not necessary, and one or more of these capturing units may be removed according to needs. In addition to these capturing units, one or more capturing units for capturing other metadata of the physical machine and/or virtual machine may be added.

The resource information capturing unit 50121 may capture information related to resources possessed by the virtual machine in the manner described above, and a detailed description thereof is omitted herein.

The operation system information capturing unit 50122 may capture information related to an operation system of the virtual machine in the manner described above. As described above, the operation system may be a predefined operation system or a user-customized operation system. For the predefined operation system, the operation system information capturing unit 50122 may find and read a configuration file of the operation system based on existing knowledge of the operation system, so as to capture the operation system information. For the user-customized operation system, the operation system information capturing unit 50122 may find and read a configuration file of the operation system according to rules set by the user, so as to capture the operation system information.

The software information capturing unit 50123 may capture software information related to software installed on the virtual machine in the above-described manner, and a detailed description thereof is omitted herein. The software information may include, for example, at least one of version information of the software, information related to a virtualization platform on which the software is installed, topology information representing a topology structure of the software, information related to objects/resources (for example, ports or data resources) invoked by the software, and the like, or may be other types of software information.

The operation system information capturing unit 50111 and the software information capturing unit 50112 in the physical machine metadata capturing unit 5011 may capture operation system information and software information of the physical machine in the same manner as the operation system information capturing unit 50122 and the software information capturing unit 50123, respectively, and detailed descriptions thereof are omitted herein.

Metadata related to the respective machines captured by the physical machine metadata capturing unit 5011 and the virtual machine metadata capturing unit 5012 are outputted to the converting unit 5013, respectively. The converting unit 5013 converts the metadata into corresponding data files, respectively. In the present embodiment, the converting unit 5013 may convert the metadata into data files in the XML format. However, the metadata may be converted into data files in other appropriate formats. It is to be noted that, the physical machine metadata capturing unit 5011 may convert the captured metadata related to the physical machine into a corresponding data file, and the virtual machine metadata capturing unit 5012 may convert the captured metadata related to the virtual machine into a corresponding data files, that is, the converting operation is performed by the two metadata capturing units 5011 and 5012, in which case the converting unit 5013 may be omitted.

Returning to FIG. 5, the generating device 502 generates a constraint definition describing a configuration constraint of the at least one machine based on the captured metadata related to the at least one machine. As described above, the configuration constraint may include at least one of a configuration constraint of the operation system, a configuration constraint of the software, and a triggered action constraint, and the user can select one or more of the configuration constraints according to actual needs.

Figure 7:
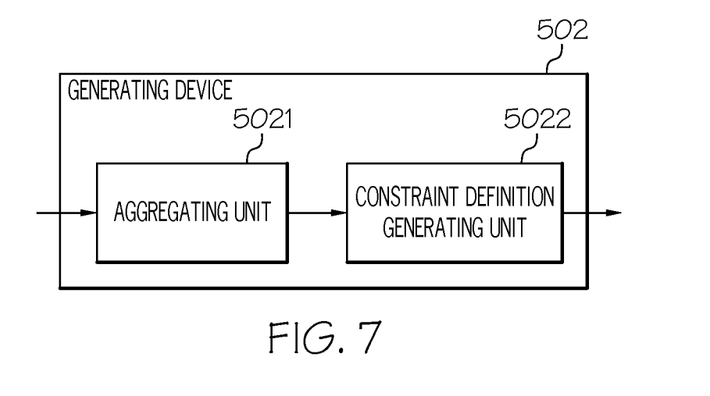
FIG. 7 is a block diagram showing a structure of a generating device shown in FIG. 5.

Hereinafter, the generating device 502 will be described in detail with reference to FIG. 7. As shown in FIG. 7, the generating device 502 may include an aggregating unit 5021 and a constraint definition generating unit 5022.

The aggregating unit 5021 aggregates the at least one data file outputted from the converting unit 5013 into a single file, i.e., the above-described context model file. The aggregating unit 5021 may perform the aggregating operation in the above-described manner or in any other appropriate manners, and a detailed description thereof is omitted herein.

The constraint definition generating unit 5022 generates the constraint definition describing the configuration constraint of the at least one machine based on the context model file. As described above, the configuration constraint may include a configuration constraint of the operation system, a configuration constraint of the software, a triggered action constraint, etc. The user may select one or more of the configuration constraints according to actual needs. The constraint definition generating unit 5022 may generate the constraint definition in the SML format or in other formats.

Specifically, the constraint definition generating unit 5022 may generate the constraint definition describing the configuration constraint of the operation system automatically, based on the metadata (for example, metadata of the operation system) related to the at least one machine which are recorded in the context model file. The user may modify the constraint definition. For example, the lifespan of the above-mentioned password may be modified from 90 days to 60 days. Or, the user may define an additional configuration constraint of the operation system by himself/herself, and a corresponding constraint definition may be generated in a predetermined format. The constraint definition generating unit 5022 may receive an editing operation of the user on the configuration constraint of the operation system, and generate a corresponding constraint definition.

In addition, the constraint definition generating unit 5022 may generate the constraint definition describing the configuration constraint of the software automatically, based on the metadata (for example, metadata of the software) related to the at least one machine which are recorded in the context model file. Likewise, the user may modify the constraint definition. Or, the user may define an additional configuration constraint of the software by himself/herself, and a corresponding constraint definition may be generated in a predetermined format. The constraint definition generating unit 5022 may receive an editing operation of the user on the configuration constraint of the software, and generate a corresponding constraint definition.

The constraint definition generating unit 5022 may further receive the triggered action constraint set by the user for various defined configuration constraints, and generate a corresponding constraint definition, as described above. In addition, when the context model file includes contents representing some type of condition, the user may set a corresponding triggered action, as a triggered action constraint, for the condition, so that the action is triggered when the condition is satisfied. In such case, the constraint definition generating unit 5022 may receive the triggered action which is set by the user, and generate a corresponding constraint definition.

The constraint definition generating unit 5022 may generate the above-described constraint definition in the manner described with reference to FIG. 2. In addition, the constraint definition generating unit 5022 may provide a configuration constraint modifying interface for the user, so that the user can edit at least one of the operation system configuration constraint, the software configuration constraint, and the triggered action constraint via the interface.

Returning to FIG. 5, the packaging device 503 packages a disk image file of the at least one machine, the metadata related to the at least one machine which are captured by the capturing device 501, and the constraint definition generated by the generating device 502, so as to generate an OVF package. The packaging device 503 may perform the packaging operation in the manner described above, and a description thereof is omitted herein.

In the above description, the OVF package is taken as an example to describe the method and apparatus according to the embodiments of the present invention, however it is only illustrative, and the present invention may also be used to create a virtual resource package in other formats.

The above method and apparatus according to the embodiments of the present invention may generate the OVF package automatically, which reduces the number of manual operations performed by the user, and thus it is not easy to make mistakes when the virtual resource package is created. Moreover, the method and apparatus may create the virtual resource package for virtual machines based on a variety of different formats/types of virtualization platforms, and thus has a wider application scope.

In addition, during creating the virtual resource package, the above method and apparatus according to the embodiments of the present invention may collect the topology information of the existing runtime environment including physical machines and/or virtual machines, so that a virtual machine deployed finally has a similar topology, and can reflect relevance among software.

Additionally, the above method and apparatus according to the embodiments of the present invention add the constraint definition describing the configuration constraint related to the machine into the created virtual resource package, thus when a virtual machine is deployed according to the generated OVF package, the deployed virtual machine can satisfy the constraint automatically. Moreover, by provided a user-friendly interface for the user, the above method and apparatus according to the embodiments of the present invention allow the user to modify/define a required configuration constraint according to needs, so that the constraint definition included in the virtual resource package comply with the requirement of the user.

In addition, the above method and apparatus according to the embodiments of the present invention are pluggable. Specifically, when some type of operation system or software is newly installed on a virtual machine, the operation system information capturing unit or the software information capturing unit may be used to capture information of the newly installed operation system or software as long as metadata capturing rules corresponding to the operation system or software are set to these units, then a virtual resource package including the information may be created.

Thus, as described herein, an object of the present invention is to provide a method and apparatus for creating a virtual resource package, which can automatically create the virtual resource package (e.g. OVF package) to thereby reduce a user's manual operations, so that the creation process is more automatic and less error-prone.

According to an aspect of the present invention, there is provided a method for creating a virtual resource package, comprising: capturing metadata related to at least one machine including at least one of a physical machine and a virtual machine; generating a constraint definition describing a configuration constraint for the at least one machine based on the captured metadata; and packaging a disk image file of the at least one machine, the captured metadata and the generated constraint definition to generate the virtual resource package.

According to another aspect of the present invention, there is provided an apparatus for creating a virtual resource package, comprising: a capturing device configured to capture metadata related to at least one machine including at least one of a physical machine and a virtual machine; a generating device configured to generate a constraint definition describing a configuration constraint for the at least one machine based on the captured metadata; and a packaging device configured to package a disk image file of the at least one machine, the captured metadata and the generated constraint definition to generate the virtual resource package.

The method and apparatus according to above aspects of the present invention may collect the topology information for the existing runtime environment including physical machines and/or virtual machines by capturing metadata related to the physical machines and/or the virtual machines. In addition, by generating the constraint definition describing the configuration constraints automatically based on the captured metadata, the method and apparatus can easily generate the virtual resource package including the configuration restraint, so that when virtual machines are deployed according to the virtual resource package, the deployed virtual machines can satisfy the respective constraints automatically. Moreover, the method and apparatus according to the above aspects of the present invention may realize automatic creation of the virtual resource package (e.g. OVF package) and reduce a user's manual operations, which not only reduces the burden imposed on the user, but also is less error-prone.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a virtual resource package, the method comprising:
   capturing, by one or more processors, metadata related to at least one machine, wherein said at least one machine includes at least one of a physical machine and a virtual machine;
   generating, by one or more processors, a constraint definition describing a configuration constraint of the at least one machine based on the captured metadata, wherein the configuration constraint limits a quantity of custom nodes that are permitted to be connected to an application server, and wherein the configuration constraint further limits a quantity of ports on a database that are permitted to be connected to the application server;
   packaging, by one or more processors, a disk image file of the at least one machine, the captured metadata and the generated constraint definition to generate the virtual resource package;
   converting, by one or more processors, the captured metadata related to the at least one machine into a plurality of data files;
   aggregating, by one or more processors, the plurality of data files into a context model file; and
   organizing, by one or more processors, the plurality of data files into at least three categories, wherein a first category is for data files related to software used by the at least one machine, wherein a second category is for the software used by the at least one machine, and wherein a third category is for hardware used by the at least one machine.

2. The method of claim 1, wherein in response to the at least one machine being a physical machine, the capturing metadata related to at least one machine includes:
   capturing, as the metadata, information related to an operation system of the physical machine, information related to hardware in the physical machine, and information related to software installed on the physical machine.

3. The method of claim 1, wherein in response to the at least one machine being a virtual machine, the capturing metadata related to at least one machine includes:
   capturing, as the metadata, information related to resources of the virtual machine, information related to an operation system of the virtual machine, and information related to software installed on the virtual machine.

4. The method of claim 3, wherein the information related to software includes topology information of the software.

5. The method of claim 1, further comprising:
   storing, by one or more processors, the plurality of data files in subdirectories that corresponding to the categories, wherein data files of a same category from the respective plurality of data files are stored together in a same subdirectory; and
   generating, by one or more processors, the constraint definition describing the configuration constraint of the at least one machine based on the context model file.

6. The method of claim 5, wherein the configuration constraint of the at least one machine includes a minimum password age for a password to utilize the operation system, a configuration constraint of the software, and a triggered action constraint of the at least one machine, wherein the at least one machine triggers an action in response to a condition of the triggered action constraint being met.

7. An apparatus for creating a virtual resource package, the apparatus comprising:
   a capturing device having a central processing unit (CPU) configured to capture metadata related to at least one machine that includes at least one of a physical machine and a virtual machine;
   a generating device having the central processing unit (CPU) configured to generate a constraint definition describing a configuration constraint of the at least one machine based on the captured metadata, wherein the configuration constraint limits a quantity of custom nodes that are permitted to be connected to an application server, and wherein the configuration constraint further limits a quantity of ports on a database that are permitted to be connected to the application server;
   a packaging device having the central processing unit (CPU) configured to package a disk image file of the at least one machine, the captured metadata and the generated constraint definition to generate the virtual resource package;
   a converting device having the CPU configured to convert the captured metadata related to the at least one machine into a plurality of data files;
   an aggregating device having the CPU configured to aggregate the plurality of data files into a context model file; and
   an organizing device having the CPU configured to organize the plurality of data files into at least three categories, wherein a first category is for data files related to software used by the at least one machine, wherein a second category is for the software used by the at least one machine, and wherein a third category is for hardware used by the at least one machine.

8. The apparatus of claim 7, wherein the capturing device includes a physical machine metadata capturing unit configured to capture, as the metadata, at least one of information related to an operation system of the physical machine and information related to software installed on the physical machine.

9. The apparatus of claim 7, wherein the capturing device includes a virtual machine metadata capturing unit configured to capture, as the metadata, at least one of information related to resources of the virtual machine, information related to an operation system of the virtual machine, and information related to software installed on the virtual machine.

10. The apparatus of claim 9, wherein the information related to software includes topology information of the software.

11. The apparatus of claim 7, further comprising:
one or more processors storing the plurality of data files in subdirectories that corresponding to the categories, wherein data files of a same category from the respective plurality of data files are stored together in a same subdirectory; and
a constraint definition generating unit having the central processing unit (CPU) configured to generate the constraint definition describing the configuration constraint of the at least one machine based on the context model file.

12. The apparatus of claim 11, wherein the configuration constraint of the at least one machine includes at least one of a configuration constraint of the operation system, a configuration constraint of the software, and a triggered action constraint of the at least one machine.

13. A computer program product for creating a virtual resource package, the computer program product comprising a computer readable hardware storage medium having program code embodied therewith, the program code readable and executable by a processor to perform a method comprising:
capturing metadata related to at least one machine, wherein said at least one machine includes at least one of a physical machine and a virtual machine;
generating a constraint definition describing a configuration constraint of the at least one machine based on the captured metadata, wherein the configuration constraint limits a quantity of custom nodes that are permitted to be connected to an application server, and wherein the configuration constraint further limits a quantity of ports on a database that are permitted to be connected to the application server;
packaging a disk image file of the at least one machine, the captured metadata and the generated constraint definition to generate the virtual resource package
converting the captured metadata related to the at least one machine into a plurality of data files;
aggregating the plurality of data files into a context model file; and
organizing the plurality of data files into at least three categories, wherein a first category is for data files related to software used by the at least one machine, wherein a second category is for the software used by the at least one machine, and wherein a third category is for hardware used by the at least one machine.

14. The computer program product of claim 13, wherein in response to the at least one machine being a physical machine, the method further comprises:
capturing, as the metadata, at least one of information related to an operation system of the physical machine and information related to software installed on the physical machine.

15. The computer program product of claim 13, wherein in response to the at least one machine being a virtual machine, the method further comprises:
capturing, as the metadata, at least one of information related to resources of the virtual machine, information related to an operation system of the virtual machine, and information related to software installed on the virtual machine.

16. The computer program product of claim 15, wherein the information related to software includes topology information of the software.

17. The computer program product of claim 13, wherein the method further comprises:
storing the plurality of data files in subdirectories that corresponding to the categories, wherein data files of a same category from the respective plurality of data files are stored together in a same subdirectory; and
generating the constraint definition describing the configuration constraint of the at least one machine based on the context model file.

* * * * *